(12) United States Patent
Stevens

(10) Patent No.: US 6,324,583 B1
(45) Date of Patent: Nov. 27, 2001

(54) METHOD AND APPARATUS FOR ENABLING COMMUNICATION BETWEEN DISSIMILAR PROTOCOL STACKS

(75) Inventor: Jerry Wayne Stevens, Raleigh, NC (US)

(73) Assignee: International Business Machines Corp., Armonk, NY (US)

(*) Notice: Subject to any disclaimer, the term of this patent is extended or adjusted under 35 U.S.C. 154(b) by 0 days.

(21) Appl. No.: 09/193,683

(22) Filed: Nov. 17, 1998

(51) Int. Cl.$^7$ ........................................ G06F 13/00
(52) U.S. Cl. ............................... 709/230; 709/227
(58) Field of Search ........................... 709/200, 224, 709/230, 227; 707/10; 370/389, 252

(56) References Cited

U.S. PATENT DOCUMENTS 5,983,259 * 11/1999 Campbell et al. .................. 709/200
6,084,859 * 7/2000 Ratcliff et al. .................... 370/252
6,084,879 * 7/2000 Berl et al. ........................ 370/389
6,141,686 * 10/2000 Jackowski et al. ................. 709/224
6,154,743 * 11/2000 Leung et al. ....................... 707/10

* cited by examiner

Primary Examiner—Zarni Maung
Assistant Examiner—Jungwon Chang
(74) Attorney, Agent, or Firm—Jerry W. Herndon; Marcia L. Doubet

(57) ABSTRACT

The invention interconnects stacks executing different protocols in the same node by means of a software implemented input/output device, thereby eliminating the need for physical resources otherwise required for data communication between the stacks. First and second connection objects are built in the virtual device in association with the lower layers of the first and second stacks, respectively. An association is also built between the first and second connection objects, thereby enabling communication between the stacks via the first and second connection objects.

15 Claims, 4 Drawing Sheets

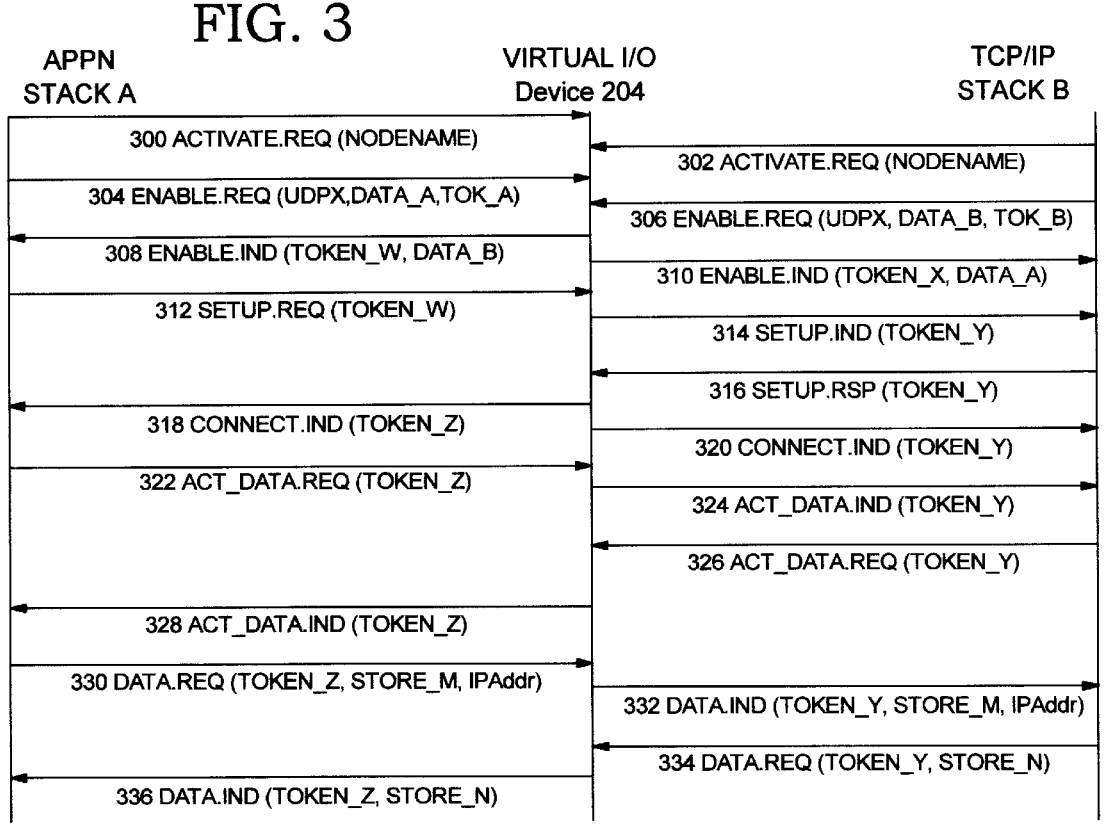
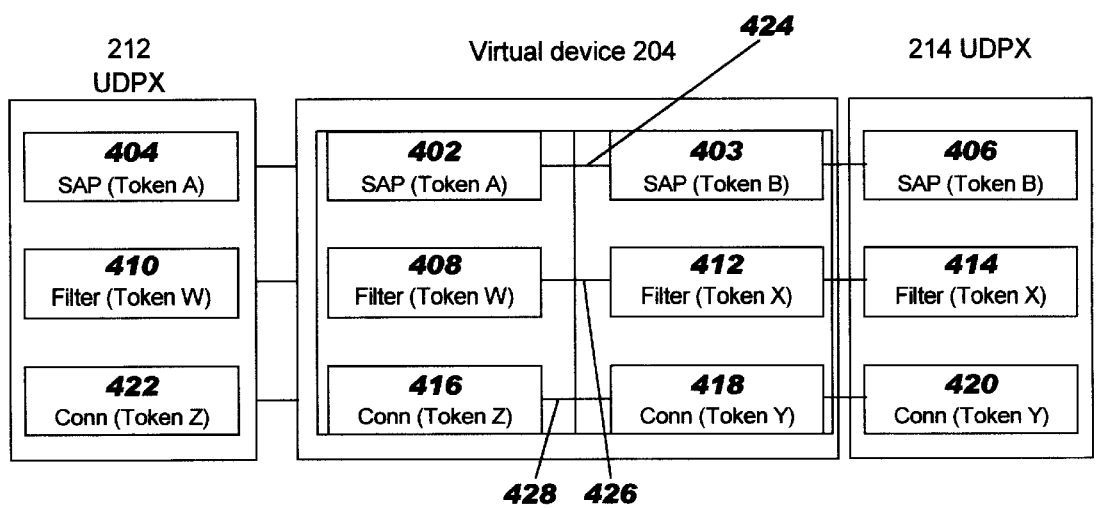

METHOD AND APPARATUS FOR ENABLING COMMUNICATION BETWEEN DISSIMILAR PROTOCOL STACKS

TECHNICAL FIELD

The invention relates to the field of networking in general and, in particular, relates to techniques for communicating between dissimilar stacks in a processing node.

BACKGROUND OF THE INVENTION

It is relatively common for a single processing node of a network to run simultaneously multiple stacks that handle different protocols. For example, a node might contain a TCP/IP stack for communications via the Internet or a corporate intranet, and at the same time run another stack such as perhaps a SNA (System Communications Architecture) stack for communications with IBM mainframes or IBM AS/400 nodes running IBM's APPN (Advanced-Peer-to-Peer) architecture. Naturally, if multiple dissimilar stacks are executing in a single node, then occasions arise in which packets must be passed between the dissimilar stacks in the ordinary course of events. Suppose, for example, that an application running under IBM's Advance-Peer-to-Peer Architecture (APPN) needs to communicate with another APPN application in a different node, but the only way of communicating between the nodes is the ubiquituous internet that uses the TCP/IP protocols. In such a case, it is desirable to communicate between an APPN stack and a TCP/IP stack in the same node so that the internet protocols can be used between the end nodes. In the known prior art, communication between different types of stacks in the same node is accomplished in one of two ways. In some cases, actual physical links and routers with protocol conversion can be used to route from one stack of a node back to a different stack of the same node. In the case of IBM's APPN, an APPN stack can communicate with a TCP/IP stack in the same node via a sockets software interface between the two stacks.

FIG. 1 shows an example of the APPN-TCP/IP prior art arrangement. FIG. 1 shows a node 100 that contains an APPN stack A and a TCP/IP stack B. Input/output services function 102 is shown that contains adapters, such as 104 and 110, that allow the node to communicate with incoming and outgoing links. The I/O services 102 also contains a sockets interface 106 and a SNA exit 108 that together connect the bottom Data Link Control (DLC) layer of the APPN stack to the top TCP layer of the TCP/IP stack. The sockets interface 106 is an API available to Applications within this node, allowing Applications to connect to the TCP/IP stack, thus allowing the Application to communicate with remote applications with similar purpose (e.g. File Transfer Program). The SNA exit 108 consists of software routines (programs) that are driven as part of the Sockets Interface (API), allowing the TCP/IP stack to pass unsolicited information to the Application (Socket), such as passing data (packets) to the application. In this arrangement, when an APPN application serviced by the APPN stack A wishes to communicate with an external application using the TCP/IP protocols, the data packets must pass through the sockets interface 106 and the SNA exit 108 to the top TCP layer of the TCP/IP stack B. The various layers of the TCP/IP stack must then process the packets as the packets move down the stack on the way to an external link via adapter 110. Obviously, this is very expensive in terms of processing cycles. It would be much more efficient if a way can be devised to enter the outbound stack, i.e., the TCP/IP B stack in this example, at the bottom Interface (IF) layer. This way, a packet would only be processed by the IF layer before being routed out to an external link, rather than being processed through all layers of the TCP/IP stack. Thus, while the prior art APPN-TCP/IP arrangement of using a sockets interface to enter the top layer of the TCP/IP stack is satisfactory from a functional point of view, it is apparent that it requires resources that are inefficient and expensive in terms of the data processing required.

SUMMARY OF THE INVENTION

The invention improves the prior art in the processing efficiency of connecting two dissimilar stacks in the same processing node. This is accomplished by establishing a virtual input/output device to connect the bottom layer of the one stack to the bottom layer of the other stack. No physical resources such as real links and routers are required and efficiency is improved by requiring processing only in the lower layer of the stack that is connected to an external link. "Virtual" here means that the device is implemented in software and provides all of the functions necessary to interconnect the stacks. The invention eliminates the need for physical links, read and write devices and control blocks as is required in the prior art.

In the preferred embodiment, a virtual input/output device implemented in software interconnects the bottom layers of first and second stacks that are executing different protocols. A first connection object is established in the virtual input/output device in association with the first stack. A second connection object is established in the virtual input/output device in association with the second stack. An association is established in the virtual input/output device between the first connection object and the second connection object. This arrangement allows data communications between the first and second stacks via the first connection object and the second connection object of the virtual input/output device.

The first and second connection objects are built in the virtual input/output device in response to a system or operator request to activate the virtual input/output device. As a result of this, a first service access point object is established in the virtual input/output device in association with the first stack and a second service access point object is established in the virtual input/output device in association with the second stack. A service access point object is a control block created to represent the user. For our purposes, the user can be thought of as a protocol stack. The SAP object holds status, user characteristics, addresses, tokens, etc. It anchors all subsequent related objects, such as protocol filter objects and the connection objects that represent the actual data connection between the stacks.

After the service access point objects are established, a first protocol filter object is established in association with the first stack and a second protocol filter object is established in association with the second stack. The protocol filter objects determine the protocol to be used by the first and second connection objects, respectively. The first and second connection objects are built after the service access point objects and the protocol filter objects have been established.

BRIEF DESCRIPTION OF THE DRAWING

FIG. 3 shows message flows that pass between two dissimilar stacks and the virtual I/O device that are used to establish the objects in the virtual device, to enable communication between the stacks;

FIG. 4 shows block diagram of the two dissimilar stacks and the virtual I/O device and the objects established by the messages of FIG. 3.

DETAILED DESCRIPTION

Figure 1:
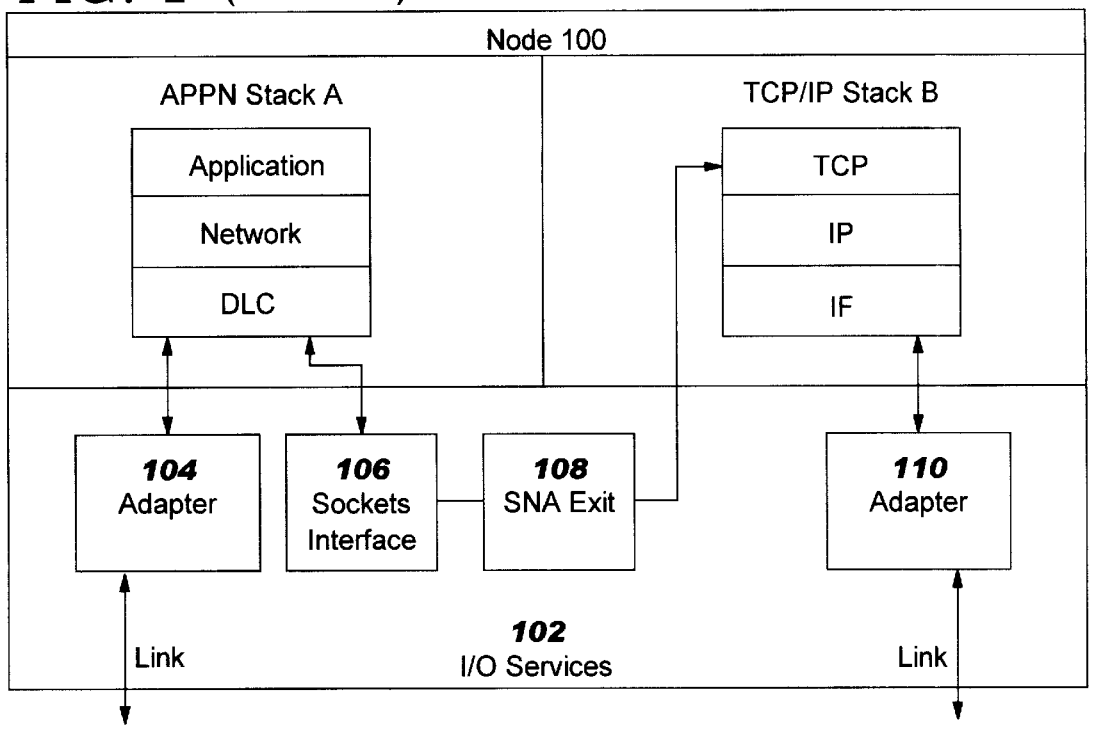
FIG. 1 shows a prior art technique of interconnecting dissimilar stacks in a single node. As shown, the technique consists of providing a sockets interface from the bottom layer of an APPN stack to the top layer of a TCP/IP stack.
Figure 2:
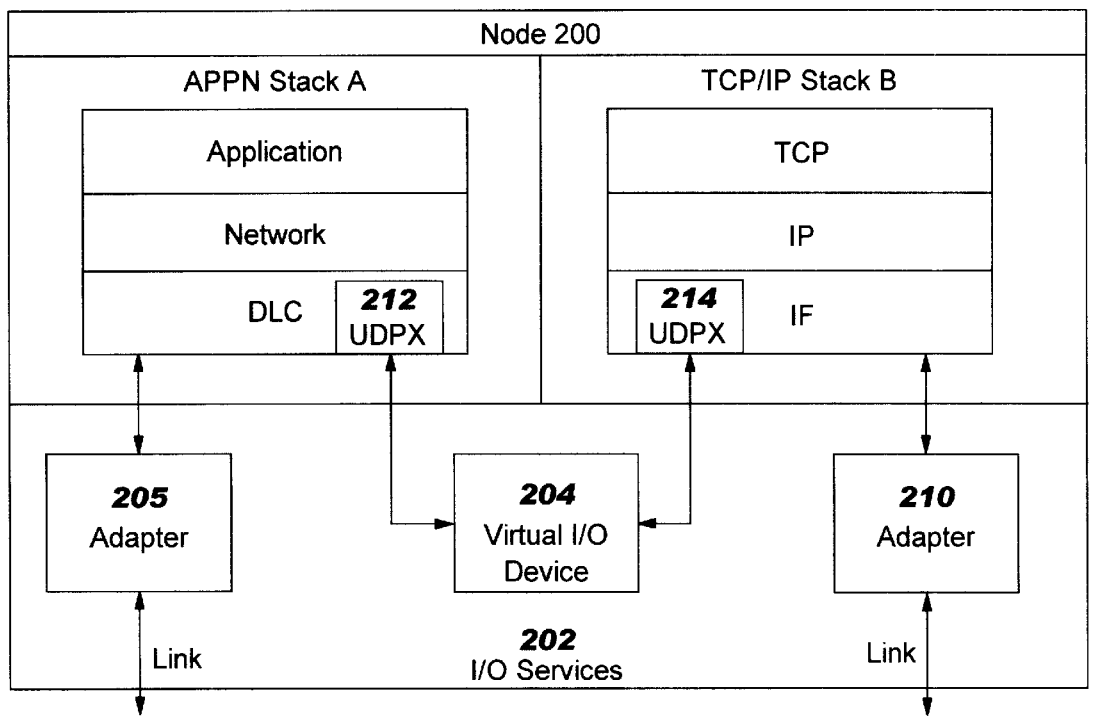
FIG. 2 shows the inventive arrangement, with the elimination of the sockets interface and the provision of a virtual I/O device that provides all of the functionality required to establish communications between the dissimilar stacks.

FIG. 2 shows essentially the same arrangement as FIG. 1, but with the invention, Virtual I/O Device 204 between the bottom layers of the two dissimilar stacks, replacing the sockets interface from the bottom layer of the APPN stack to the top layer of the TCP/IP stack. FIG. 2 shows a node 200 equipped with an APPN stack A and a TCP/IP stack B. It should be understood that these types of stacks are for illustration and that stacks of any dissimilar types of networking protocols might fall within the scope and spirit of the invention. The bottom layer of the APPN stack is commonly referenced as the Data Link Control, or DLC, layer. The bottom layer of the TCP/IP stack is commonly referenced as the Interface, or IF, layer. Both of the bottom layers interface to the physical link media such as via adapters 205 and 210. The DLC layer of the APPN stack contains a software module UDPX 212. The IF layer of the TCP/IP stack contains a counterpart module UDPX 214. The Virtual I/O Device 204 is illustratively shown to reside in an I/O services area 202 of node 200 between these modules 212 and 214. The function of UDPX 212 and 214 is to assist in establishing objects in virtual I/O device 204, including connection objects that represent a logical connection between the stacks (similar to emulating a physical link between the stacks as if they were in different nodes) and ultimately to communicate between the stacks as part of an end-to-end data connection. The protocol that is used by UDPX 212 and 214 is shown in FIG. 3 to establish the virtual I/O device 204 objects, including connection objects, and ultimately to provide end user communication via the connection objects. In this illustrative embodiment, the node containing the dissimilar stacks illustratively is an IBM System/390 mainframe equipped with an MVS operating system and access software, such as IBM's Virtual Telecommunications Access Method (VTAM). The I/O services 202 component of the node 200 is part of VTAM. MVS and VTAM are well known and understood by workers in the art and no detailed discussion of their operation is deemed necessary for an understanding of the invention.

FIG. 3 illustrates the message flows between the two stacks and the virtual I/O device 204 of FIG. 2 that activate communications between the stacks. Messages flowing from a stack to virtual device 204 are referred to as requests, abbreviated as .REQ in FIG. 3. As will be seen, communication between the stacks via virtual device 204 uses token addressing as contrasted with the standard addressing schemes used by APPN and TCP/IP for communications external to the node. If a request (REQ) message is accepted by virtual device 204, a confirm message is returned to the stack that originated the request message. Confirm messages are omitted from FIG. 3 for simplicity. A stack may also respond to a request message with a response message (abbreviated as .RSP) in FIG. 3. Messages containing new information that flow from virtual device 204 to a stack, i.e. not confirm messages, are referred to as indications (abbreviated as .IND in FIG. 3). The software that forms a stack is configured with a pre-defined reserved name, such as THIS-HOST, which represents the virtual device 204. When a node operator or system procedure wishes to establish communications between the stacks A and B of FIG. 2, the operator or procedure issues a system command to activate the device "THIS-HOST". The message flows depicted in FIG. 3 result and establish the desired communication between the stacks. There are no required definitions in the I/O services area 202 of the node 200 or in the virtual device 204.

Attention is now directed to FIG. 3, which shows the message flows between the dissimilar stacks A and B and virtual device 204 which establish data communication between the stacks via the virtual device 204. The vertical line at the left of FIG. 3 represents APPN stack A. Similarly, the vertical line on the right of FIG. 3 represents TCP/IP stack B. The vertical line in the middle of FIG. 3 represents the virtual device 204. When a node operator or a procedure issues a command to activate device THIS-HOST, both stacks A and B receive the command via a system interface to the top layer of the respective stack. After the activate command propagates down the APPN stack to the DLC layer, the DLC layer recognizes from system definitions the name THIS-HOST and its assignment to virtual I/O device 204. As a result, stack A generates and sends an activate request message to virtual device 204, as shown at flow 300 of FIG. 3. As shown in flow 300, this request message contains the reserved name THIS-HOST in the field NODE-NAME as a parameter of the request message 300. Similarly, stack B also generates an activate THIS-HOST message 302 in response to a system operator or procedure command. Virtual device 204 recognizes that both of the activate request messages 300 and 302 contain the same node name "THIS-HOST". Therefore, in response to these requests 300 and 302, virtual device 204 builds in its software separate service access point (SAP) objects to represent the stacks A and B, respectively, and it associates in its memory the two SAP objects with each other. Virtual device 204 assigns a unique token to each of the SAP objects. Virtual device 204 also returns a confirm message to each of the stacks (confirm messages are not shown for simplicity) that contains the unique token identifying the SAP object associated with the respective stack. FIG. 4 shows the stack representations in device 204, as well as representations that will be built in the stacks themselves as the message flows progress. At this point in the description, it is assumed that device 204 assigned token A to a SAP object 402 associated with stack A and token B to a SAP object 403 associated with stack B and that the SAP objects are associated with each other in device 204 memory as represented at 424. The confirm messages from device 204 to stacks A and B contain the assigned tokens A and B, respectively. In response to the confirm message, stack A builds a SAP object 404 also associated with token A. Likewise, stack B builds a SAP object 406 associated with token B.

After stack A builds its SAP object 404, at 304 it sends to virtual device 204 an enable request identifying the protocol UDPX that is to be used across this communication connection and a data block DATA_A, and also returns its Token A. Protocol UDPX is a term for identifying the protocol or specifications of the interface that occurs between the two stacks. It allows two unlike stacks (stacks which support different network protocols) to communicate using a predefined interface, and distinguish itself from the other network protocols (e.g. UDP or APPN). Data block DATA_A contains the local IP address that is assigned to the APPN stack A and the reserved port numbers that are used to address the APPN stack A. DATA_A also contains information that is used later to determine which stack A or B will initiate the actual connection setup request. This is described at the appropriate time below. The same operations occur between stack B and virtual device 204 at flow 306 of FIG. 3.

In response to the enable requests 304 and 306, virtual device 204 builds a separate filter object for each stack. Specifically, filter object 408 is built for the APPN stack A and filter object 412 is built for the TCP/IP stack B. Filter objects 408 and 412 are associated with each other as illustrated at 426. These filter objects determine what protocol (UDPX in this example) will ultimately be used on the connection that is being established. In this example, it is assumed that device 204 assigns a token W to the filter object 408 associated with stack A. At 308, virtual device 204 sends an enable indication to stack A. This indication confirms that virtual device 204 is able to implement the UDPX protocol. The indication 308 further includes the token W assigned to the filter object 408 and the DATA_B information that was received from stack B on the 306 enable request from stack B. As a result of the 308 enable indication, stack A builds its filter object 410 and associates it with the token W. Similarly, virtual device 204 also builds a filter object 412 associated with stack B and assigns a token (X in this example) to that object. Device 204 then sends an enable indication 310 to stack B that contains this token X and the DATA_A information from stack A. In response to the enable indication 310, stack B builds its filter object 414 and associates it with token X.

Both stacks A and B are now aware of each other and can determine, when desired, if and when a logical end-to-end connection should be established and, if so, which stack should initiate the final connection. If it is assumed that a decision is made to establish the final end-to-end logical connection between stacks A and B and that stack A is to initiate it, then a setup request flow 312 is sent from stack A to virtual device 204 containing the filter token W. DATA_A and DATA_B (which each stack received from the other in flows 308 and 312) are used to make these determinations. In response to flow 312, virtual device 204 builds an object 416 representing a new end-to-end user connection to stack A. It is assumed that device 204 assigns token Z to this end-to-end connection object. Device 204 also builds a connection object 418 representing the end-to-end connection to stack B and assigns token Y to this connection object. These connection objects are associated with each other as represented at 428 of FIG. 3. After building the connection objects 416 and 418, device 204 sends a setup indication 314 to stack B and includes the token Z to identify the new connection to stack B. In response to flow 314, stack B builds its connection object representation 420 of this connection and associates it with the token Y. Stack B now returns a setup response 316 to virtual device 204 to confirm this part of the setup. Setup response 316 includes token Y to identify the connection to which this indication pertains. Virtual device 204 now updates its state of the new end-to-end connection and in so doing essentially activates the connection between stacks A and B from its viewpoint. Virtual device 204 informs both stacks A and B of the activated state of the end-to-end connection. This occurs at flows 318 to stack A and at flow 320 to stack B. Flow 318 includes token Z, which represents the end-to-end connection to stack A; flow 320 to stack B includes the token Y, which represents the end-to-end connection to stack B. In response to connection indications 318 and 320, both stacks A and B build their object representations of the new connection and associate the connection objects with the tokens contained in the respective flows 318 and 320. Thus, stack A associates its connection object 422 with token Z and stack B associates its connection object 420 with token Y.

After stack A builds its connection object 422, it sends at 322 an activate data request to inform virtual device 204 that stack A is ready to accept user data on the end-to-end connection. The token Z in flow 322 identifies the end-to-end connection to virtual device 204 to which stack A is referring. In response to this activate data request 322, virtual device 204 sends an activate data indication 324 to stack B to inform it that stack A is ready to accept data. Token Y in indication 324 identifies the connection in question to stack B. When stack B is also ready to begin communications on the end-to-end connection, it sends an activate data request 326, including the token Y, to virtual device 204; virtual device 204 sends an activate data indication 328, including token Z, to stack A to inform it that stack B is ready to receive data on the connection. The end-to-end connection between stacks A and B is now complete and ready for data communication.

Now assume that some APPN application served by stack A is ready to send data to an APPN application at a foreign node. Assume further that we wish to use the internet (TCP/IP) protocols as the medium between the present node and the foreign node. To do this, we can use the logical connection setup through virtual device 204 to connect the present APPN application to TCP/IP stack B, hence via the IF layer of stack B to adapter 210 and to an external link to the foreign node. At the foreign node, a similar TCP/IP stack receives the data and communicates with an APPN stack via the same virtual device mechanism disclosed herein at the foreign node. In the present node, APPN stack A assembles the data to be communicated to stack B in a conventional and well-known manner into a plurality of buffers. Stack A next generates a data request 330 and transmits it to virtual device 204. Data request 330 includes the token Z to identify the end-to-end connection and a parameter STORE_M which contains a list of the buffers into which the data to be communicated is stored. It also includes the IP address of the destination node. All APPN headers and user data is managed by the APPN stack A. Virtual device 204 is not aware of and does not care which data in the buffer list contains APPN headers and user data. That is for the APPN stack at the foreign node to decipher. Virtual device 204 receives the data request 330 and, in response, attaches a new buffer as the first buffer to provide additional storage for TCP/IP stack B to store the appropriate UDP (TCP/IP User Datagram Protocol) headers for transmission over the TCP/IP internet. Virtual device 204 now transmits a data indication 332 to stack B. Data indication 332 contains token Y to identify the end-to-end connection to stack B and the parameter STORE_M received in the data request message 330, which points to the new buffer list that contains the data being transmitted and the prepended buffer for UDP header space. When stack B receives data indication 332, it processes the data pointed to by STORE_M in a conventional manner; using the passed destination node IP address. Stack B calculates the physical connection to use in forwarding the packet (the buffer list) and passes the packet via adapter 210 into the internet IP network.

Stack B may also receive a packet from a foreign node destined for a reserved port in stack A previously established during the enable and setup messages. This would be a packet destined for stack A and an APPN application in the present node. If this is the case, stack B removes the UDP header of the packet and transmits the remaining buffer list to virtual device 204, as shown at data request 334 of FIG. 4. Data request 334 includes token Y and a parameter STORE_N, which points to the buffers of data to be transmitted to stack A. As described above, virtual device 204 transforms data request 334 into a data indication 336 that it transmits to stack A for processing.

Once the end-to-end connection has been established between stack A and stack B, as described above and as represented by connection objects 416, 418, 420 and 422, the connection remains in place for data communication until it is torn down. While the connection is established, there is no need for the SAP and filter objects 402 through 414. These objects are only used for later connection teardown on request from a system procedure or a system operator.

Figure 5:
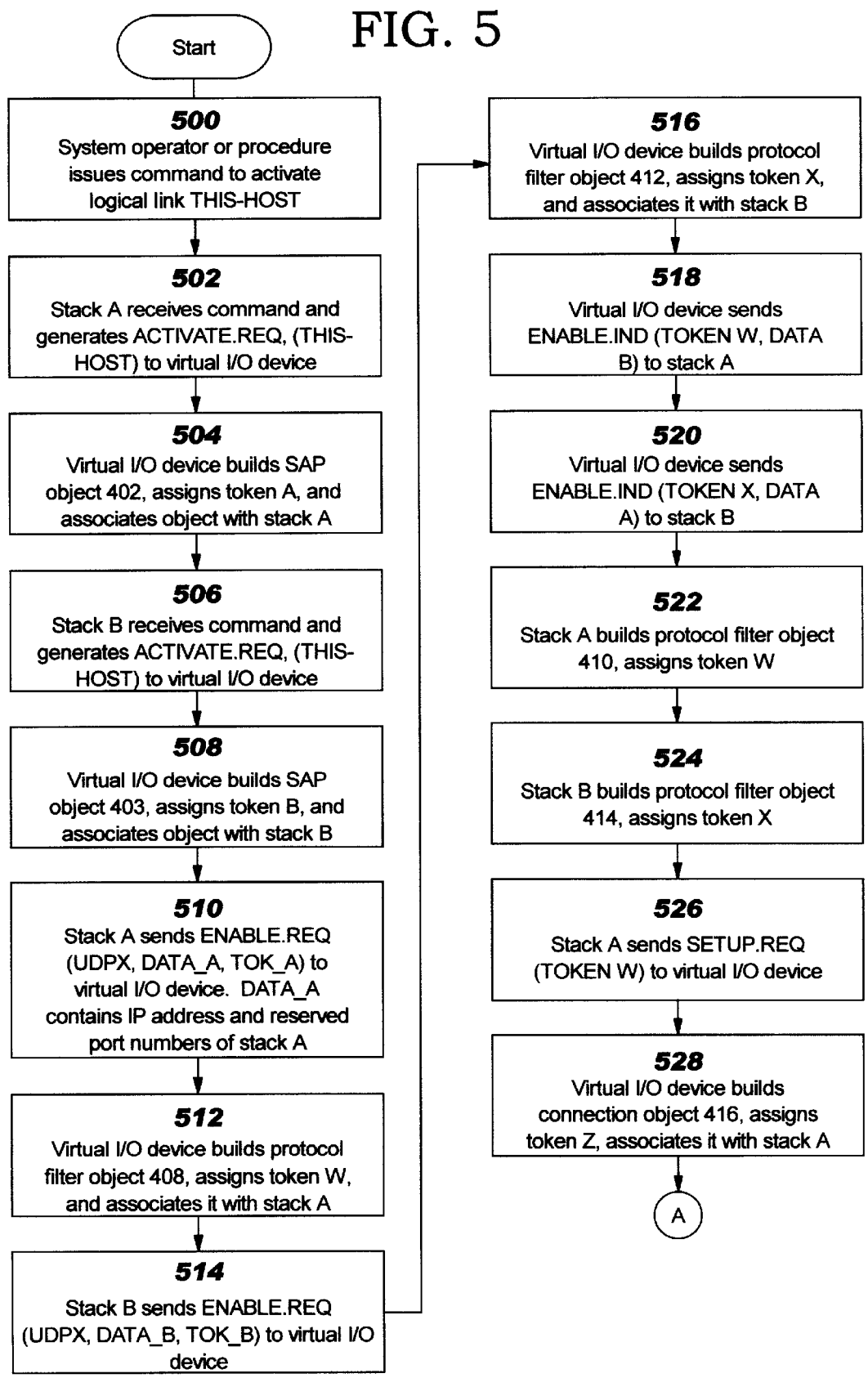
FIGS. 5 and 6 show a flowchart of steps that establish the objects of FIG. 4 and communication between the stacks.
Figure 6:
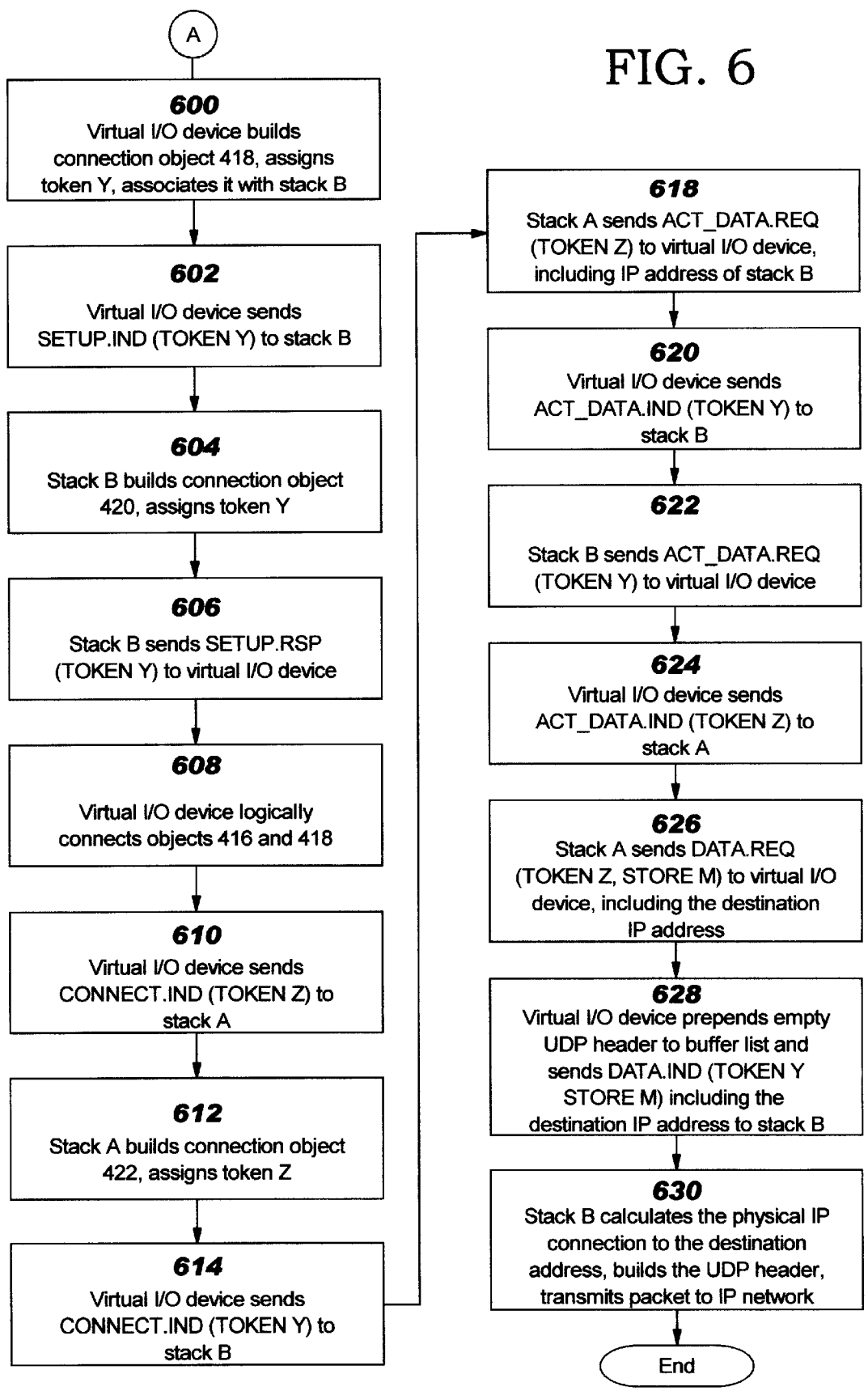

FIGS. 5 and 6 show functional flowcharts of the process described above of establishing a logical end-to-end communication path between the stacks A and B via virtual device 204. In FIG. 5, at step 500, a system operator or system procedure issues a command to activate the logical link THIS-HOST. It is recalled that THIS-HOST is a reserved name that identifies a logical link between stacks A and stack B via the virtual device 204. At step 502, stack A receives the activate THIS-HOST command, recognizes THIS-HOST as a reserved connection associated with virtual device 204, and responds by generating an ACTIVATE.REQ message to virtual device 204. THIS-HOST is included in the ACTIVATE.REQ message to distinguish this logical connection from other logical connections in which virtual device 204 may participate. At step 504, virtual device 204 responds to the ACTIVATE.REQ message by building a Service Access Point (SAP) object 402, arbitrarily assigns a token A to the SAP, and associates by means of a table entry or the like, the SAP 402 with stack A. SAP 402 is a control block that holds status, user characteristics, addresses, tokens, etc. It anchors all subsequent related objects, such as protocol filter object 408 and connection object 416 and it controls the status of these objects.

It is assumed that Stack B receives the activate THIS-HOST command from the system operator or system procedure at 506 and responds with an ACTIVATE.REQ (THIS-HOST) to virtual device 204. In the same manner as described for stack A, virtual device 204 responds at step 508 by building a SAP 403 for the connection to stack B. This SAP 403 is arbitrarily assigned an identifying token B.

Virtual device 204 returns confirm messages to both stacks A and B after building the SAP objects. In response to the confirm message, stack A, at step 510, sends an ENABLE.REQ message to virtual device 204. This message contains as parameters the protocol desired to be used over the logical connection being established (here, UDPX), the token A assigned by virtual device 204 to stack A, and some data DATA_A. DATA_A is used later to determine which stack will initiate the final request to activate the logical end-to-end connection between the stacks A and B. In response to the ENABLE.REQ message from stack A, virtual device 204 builds a protocol filter object 408 for stack A and assigns it a token W for identification (step 512). The purpose of the protocol filter object 408 is to identify the different protocols that are supported for possible use on the end-to-end connection and, subsequently, to negotiate with the stacks the specific protocol that will be used on the end-to-end connection. For this particular connection, the negotiation always results in the predefined protocol UDPX being selected.

Similarly, stack B sends an ENABLE.REQ message to virtual device 204 at step 514 in response to the ACTIVATE.REQ confirm message returned from virtual device 204. The ENABLE.REQ message also contains the protocol to be used on the end-to-end connection (UDPX in this example) and some data DATA_B, as well as TOKEN_B. Virtual device 204 builds a protocol filter 412 for stack B in response to this stack B ENABLE.REQ message and assigns it a token X for identification (step 516).

At step 518, virtual device 204 now sends an ENABLE.IND message to stack A to inform stack A that stack B is ready to proceed with final establishment of the end-to-end connection. The token W is included in this message to identify the filter object W in question and DATA_B from stack B is also included. Similarly, at step 520, virtual device 204 sends an ENABLE.IND message to stack B and includes the token X and DATA_A from stack A. In response to these enable indication messages, both stacks A and B build protocol filter objects 410 and 414, respectively, at steps 522 and 524. Protocol filters 410 and 414 in the stacks allow them to logically separate end-to-end connections for each supported protocol.

Stack A now consults its data DATA_A and the data DATA_B from stack B to determine which stack will initiate the final connection setup request. Stack B does the same thing with its data DATA_B and with DATA_A. Assume that in this example, both stacks conclude that stack A should initiate the connection setup request. At step 526, stack A sends a SETUP.REQ message with token Z to virtual device 204. In response, at step 528, virtual device 204 builds a connection object 416 for stack A and assigns it an arbitrary and unique token Z for identification. Continuing on in FIG. 6, at step 600, virtual device 204 also builds a connection object 418 for stack B and assigns it a unique token Y. At step 602, virtual device 204 now sends a SETUP.IND message with the token Y to stack B. Stack B responds to the SETUP.IND message at step 604 by building a connection object 420 and assigns the received token Y to the object. To confirm the establishment of its connection object, stack B returns a SETUP.RSP message to virtual device 204 at step 606. At step 608, virtual device 204 logically connects connection objects 416 and 418 together to partially form the end-to-end connection. At step 610, virtual device 204 informs stack A of the present progress of connection establishment by sending a CONNECT.IND message to stack A. This message includes the token Z assigned to connection object 416 to inform stack A of the identity of the connection object in virtual device 204. In response to the CONNECT.IND message, stack A builds its connection object 422 and assigns the received token Z to the object (step 612).

At step 614, virtual device 204 informs stack B of the present progress of connection establishment by sending a CONNECT.IND message to stack B. This message includes the token Y assigned to connection object 418 to inform stack B of the identity of the connection object in virtual device 204.

The end-to-end connection is essentially established at this point. The final operations are to formally activate it. To do this, at step 618, stack A sends an ACT_DATA.REQ message to virtual device 204, identifying Z as the token of the relevant connection object. At step 620, virtual device 204 responds by sending an ACT_DATA. IND, with token Y, to stack 13. Stack B now updates its connection object 420 to show that the connection is active and then sends at step 622 an ACT_DATA.REQ message to confirm this fact. Virtual device 204 receives the ACT_DATA.REQ message from stack B and at step 624 informs stack A of the active connection state of stack B by sending an ACT_DATA.IND message, with token Z, to stack A. Stack A updates its connection state in response to the ACT_DATA.IND message.

The end-to-end connection is now completely operational and either stack may send user application data to the other stack at will. This is illustrated at step 626, where it is assumed that stack A sends a DATA.REQ message to stack B via virtual device 204. In this message, token Z identifies the relevant connection object Z in virtual device 204 and STORE_M identifies the location of the buffer list that contains pointers to the actual user application data to be transmitted to stack B. STORE_M also identifies the IP address of the destination port at the foreign node. At step 628, virtual device 204 prepends an empty buffer to the buffer list to allow stack B to add an IP UDP header to the packet to be transmitted. Virtual device 204 also translates the connection token Z into the relevant token Y for stack B and sends the data to stack B with a DATA.IND (TOKEN_Y, STORE M) message. At step 630, stack B calculates the physical IP connection to the destination address; it builds the UDP header and stores it in the empty buffer prepended by virtual device 204 at the top of the list, and transmits the packet to the destination node.

Stack B is also able to send data to stack A via the connection objects in the same manner as discussed immediately above.

It is to be understood that the above described arrangements are merely illustrative of the application of principles of the invention and that other arrangements may be devised by workers skilled in the art without departing from the spirit and scope of the invention.

What is claimed is:

1. Apparatus for interconnecting two protocol stacks executing different protocols in a single processing node for data communication between a first of the stacks and a second of the stacks, comprising
    a virtual input/output device implemented in software, the virtual input/output device further comprising
        means for building a first connection object for transmitting and receiving data packets with a bottom layer of the first stack,
        means for building a second connection object for transmitting and receiving data packets with a bottom layer of the second stack, and
        means for associating the first and second connection objects with each other, thereby establishing a logical end-to-end connection between the bottom layers of the first and second stacks.

2. The apparatus of claim 1 wherein the means for building the first connection object and the means for building the second connection object further comprise
    means responsive to activate requests from the first and second stacks for building a first service access point object and a second service access point object, respectively, for controlling subsequent operation of the means for building the first and second connection objects, respectively,
    means for associating the first and second service access points with each other.

3. The apparatus of claim 2 wherein the means for building the first connection object and the means for building the second connection object further comprise
    means responsive to first and second enable requests from the first and second stacks, respectively, subsequent to operation of the means for building the first and second service access point objects, for building a first filter object associated with the first stack and a second filter object associated with the second stack, the first and second filter objects identifying a protocol to be used by the first and second connection objects, respectively, and
    means for associating the first and second filter objects with each other.

4. The apparatus of claim 3 wherein the means for building the first connection object and the means for building the second connection object further comprise
    means responsive to setup requests from the first and second stacks, subsequent to operation of the means for building the first and second filter objects, for initiating operation of the means for building the first and second connection objects.

5. The apparatus of claim 1 wherein the first stack and the second stack further comprise
    a third and a fourth connection object, respectively, the third connection object being associated with the first connection object in the virtual input/output device and the fourth connection object being associated with the second connection object in the virtual input/output device, and the first and second connection objects being associated with other to result in an end-to-end connection between the third and fourth connection objects via the virtual input/output device.

6. Apparatus for interconnecting two protocol stacks executing different protocols in a single processing node for data communication between the stacks, comprising
    a virtual input/output device implemented in software,
    means for establishing a first connection object as part of the virtual input/output device representing part of an end-to-end connection to a first one of the stacks,
    means for establishing a second connection object as part of the virtual input/output device representing another part of the end-to-end connection to a second one of the stacks,
    means for establishing in a lower layer of the first stack a third connection object,
    means for establishing in a lower layer of the second stack a fourth connection object,
    means in the first stack for associating the third connection object with the first connection object,
    means in the virtual input/output device for associating the first connection object with the third connection object,
    means in the virtual input/output device for associating the first connection object with the second connection object,
    means in the virtual input/output device for associating the second connection object with the fourth connection object, and
    means in the second stack for associating the fourth connection object with the second connection object,
    thereby establishing a complete virtual data communications path between lower layers of the first and second stacks via the first, second, third and fourth connection objects.

7. A method of interconnecting multiple protocol stacks executing different protocols in a single processing node for data communication between a first of the stacks and a second of the stacks, comprising steps of
    activating a virtual input/output device implemented in software, establishing a first connection object in the virtual input/output device in association with a lower layer of the first stack, establishing a second connection object in the virtual input/output device in association with a lower layer of the second stack, establishing an association in the virtual input/output device between the first connection object and the second connection object, and transmitting data packets between the lower layers of the first and second stacks via the first connection object and the second connection object.

8. The method of claim 7 further comprising building the first and second connection objects in response to a request to activate the virtual input/output device.

9. The method of claim 8 wherein the building step further comprises establishing a first service access point object in association with the first stack and a second service access point object in association with the second stack, for controlling the subsequent building of the first and second connection objects, respectively, and associating the first and second service access points with each other.

10. The method of claim 9 wherein the building step further comprises establishing a first protocol filter object in association with the first stack and a second protocol filter object in association with the second stack for determining a protocol to be used by the first and second connection objects, respectively, and associating the first and second protocol filter objects with each other.

11. The method of claim 10 wherein the building step further comprises initiating the building of the first and second connection objects responsive to a setup request from the first stack, the setup request occurring subsequent to the establishment of the first and second protocol filter objects.

12. The method of claim 7 further comprising establishing a third connection object in the first stack for transmitting and receiving data between the third connection object and the first connection, and establishing a fourth connection object in the second stack for transmitting and receiving data between the fourth connection object and the second connection object, thereby resulting in an end-to-end connection between the third and fourth connection objects via the virtual input/output device.

13. A computer program embodied on a computer-readable medium for enabling data communication between two protocol stacks of a single processing node in which both a first of the stacks and a second of the stacks are executing different protocols comprising, a first code segment comprising code for activating a virtual input/output device implemented in software, a second code segment for establishing a first connection object in the virtual input/output device in association with a lower layer of the first stack, a third code segment for establishing a second connection object in the virtual input/output device in association with a lower layer of the second stack, a fourth code segment for establishing an association in the virtual input/output device between the first connection object and the second connection object, and a fifth code segment for transmitting data packets from the first stack to the second stack via the first connection object and the second connection object.

14. A computer data signal embodied in a carrier wave for enabling data communication between two protocol stacks of a single processing node in which both a first of the stacks and a second of the stacks are executing different protocols, comprising a first code segment comprising code for activating a virtual input/output device implemented in software, a second code segment for establishing a first connection object in the virtual input/output device in association with a lower layer of the first stack, a third code segment for establishing a second connection object in the virtual input/output device in association with a lower layer of the second stack, a fourth code segment for establishing an association in the virtual input/output device between the first connection object and the second connection object, and a fifth code segment for transmitting data packets from the first stack to the second stack via the first connection object and the second connection object.

15. A method of enabling communication between two protocol stacks of in which both a first of the protocol stacks and a second of the protocol stacks are executing different protocols, comprising steps of:

storing, by a virtual input/output device implemented in software, information about the first protocol stack and the second protocol stack, generating, by the virtual input/output device, a plurality of tokens to identify the stored information, passing selected ones of the generated tokens from the virtual input/output device to the first and second protocol stacks, for use in subsequent messages, and establishing, upon receiving a connection request message from the first protocol stack, a logical end-to-end connection between the first protocol stack and the second protocol stack, wherein a first selected one of the passed tokens is returned to the virtual input/output device with the connection request message, and wherein receipt of the connection request message causes the virtual input/output device to send a second selected one of the generated tokens to the second protocol stack along with a connection notification message, the second selected one of the generated tokens being associated with the returned token.

* * * * *